United States Patent
Rommens et al.

(10) Patent No.: US 9,192,181 B2
(45) Date of Patent: Nov. 24, 2015

(54) METHOD AND SYSTEM FOR MODIFYING RAW FOODS, AND RAW FOOD PRODUCT MADE THEREBY

(71) Applicant: Nightshade, LLC, Boise, ID (US)

(72) Inventors: Caius D Rommens, Boise, ID (US); Heather M Holloway, Colville, WA (US); Roy D Holloway, Boise, ID (US)

(73) Assignee: NIGHTSHADE, LLC, Boise, ID (US)

( * ) Notice: Subject to any disclaimer, the term of this patent is extended or adjusted under 35 U.S.C. 154(b) by 0 days.

(21) Appl. No.: 14/247,232

(22) Filed: Apr. 7, 2014

(65) Prior Publication Data
US 2015/0099711 A1 Apr. 9, 2015

Related U.S. Application Data

(60) Provisional application No. 61/809,848, filed on Apr. 8, 2013.

(51) Int. Cl.
| | |
|---|---|
| *A23L 1/29* | (2006.01) |
| *A23L 1/212* | (2006.01) |
| *A23L 1/275* | (2006.01) |
| *A23N 15/06* | (2006.01) |
| *A61K 31/522* | (2006.01) |
| *A61K 31/704* | (2006.01) |
| *A23L 1/09* | (2006.01) |
| *A23L 1/22* | (2006.01) |
| *A23L 1/221* | (2006.01) |
| *A23L 1/236* | (2006.01) |
| *A23L 1/27* | (2006.01) |
| *A23L 1/30* | (2006.01) |

(52) U.S. Cl.
CPC . *A23L 1/212* (2013.01); *A23L 1/09* (2013.01); *A23L 1/097* (2013.01); *A23L 1/22* (2013.01); *A23L 1/221* (2013.01); *A23L 1/236* (2013.01); *A23L 1/2361* (2013.01); *A23L 1/2366* (2013.01); *A23L 1/2367* (2013.01); *A23L 1/27* (2013.01); *A23L 1/2751* (2013.01); *A23L 1/2756* (2013.01); *A23L 1/30* (2013.01); *A23N 15/06* (2013.01); *A61K 31/522* (2013.01); *A61K 31/704* (2013.01); *A23V 2002/00* (2013.01)

(58) Field of Classification Search
CPC ........... A23V 2200/05; A23V 2200/15; A23V 2200/30; A23V 2250/24; A23V 2250/5112; A23L 1/30; A23L 1/212
USPC .......... 426/615, 658, 650, 648, 506, 250, 639
See application file for complete search history.

(56) References Cited

U.S. PATENT DOCUMENTS

| | | | |
|---|---|---|---|
| 5,288,626 A * | 2/1994 | Levengood | 800/292 |
| 2002/0012725 A1* | 1/2002 | Carlson | 426/281 |
| 2009/0011939 A1* | 1/2009 | Thrower et al. | 504/319 |

* cited by examiner

*Primary Examiner* — Helen F Heggestad
(74) *Attorney, Agent, or Firm* — Parsons Behle & Latimer

(57) ABSTRACT

A method for modifying a quality of a fruit includes cutting a live stem attached to a live fruit at a cut distance from the fruit, producing a cut end of the stem, contacting only the cut end of the stem with a solution comprising at least one mobile and quality-modifying food ingredient while protecting the fruit from contact with the solution, and keeping the cut end of the stem in contact with the solution for an incubation time sufficient to allow absorption and transport of the food ingredient into the fruit, the food ingredient conferring a modified quality upon the fruit. A system for practicing the method and an edible raw plant product produced by the method are also disclosed.

20 Claims, 5 Drawing Sheets

1. GROW
2. CUT A STEM FEEDING INTO THE FRUIT(S)
3. ATTACH A BULB CONTAINING A SOLUTION WITH AT LEAST ONE MOMO-INGREDIENT TO THE CUT STEM SURFACE
4. ALLOW THE MOMO-INGREDIENT TO BE ABSORBED AND TRANSPORTED INTO THE FRUITS
5. EAT THE RAW VEGETABLE WITH MODIFIED QUALITY

TABLE 1

| | | TOMATO | CARROT | CELERY | LETTUCE | PARSLEY | STRAWBERRY |
|---|---|---|---|---|---|---|---|
| STIMULANTS | CAPSAICIN(1) | | + | + | | + | |
| | WS GINSENG | | + | | + | + | |
| | CAFFEINE(1) | | + | + | | | |
| SWEETENERS | WS STEVIA | | | | | | |
| | SUCRALOSE | +(2) | + | + | + | + | +(2) |
| | ACESULFAME-K | +(2) | + | + | + | + | +(2) |
| | BEET EXTRACT | | | | | | |
| HEALTH-PROMOTING COLORANTS | WS ANNATTO | | | + | + | + | |
| | GREEN NO. 3 | | + | + | + | | |
| OTHER COLORANTS | RED NO. 40 | | | + | + | + | +(2) |
| | CARMINE | | + | | | | |
| AROMA | VANILLIN | | | | | | |
| | METHYL ANTHRANILATE | | | | | | |
| | MALTOL | | + | + | | | |
| | LEMON-LIME | | | | + | | |

(1): WITH 0.15 g HYDROXYPROPYL-BETA-CYCLODEXTRIN AND 15-MICROLITER L-77 PER 10 ml TOTAL-VOLUME;
(2): OPTIONALLY WITH 1 g SUCROSE PER 10 ml TOTAL-VOLUME TO AID TRANSPORT

FIG. 6

METHOD AND SYSTEM FOR MODIFYING RAW FOODS, AND RAW FOOD PRODUCT MADE THEREBY

PRIORITY CLAIM

The present application claims the benefit of U.S. Provisional Patent Application Ser. No. 61/809,848, filed on Apr. 8, 2013 and entitled "RAW FOOD INFUSIONS," the disclosure of which is incorporated herein by reference in its entirety.

FIELD OF THE DISCLOSURE

The present disclosure relates generally to the field of food processing. More particularly, the present disclosure presents methods and apparatus for modifying raw foods, such as vegetables, fruits and herbs, using ingredients that provide a modified taste, flavor, aroma, health-promoting activity, and/or stimulating activity, and the raw vegetables, fruits and herbs that are produced thereby.

BACKGROUND

Plant-derived foods ("foods") can be classified into three different groups. The first group of foods consists of the harvested and optionally washed but not processed edible raw parts of crops ("raw foods"). The frequent consumption of these foods is often associated with a healthy life style.

The second group of foods consists of the processed derivatives of raw foods ("processed foods") that are produced by (1) cutting, slicing, or grinding the raw foods into smaller or small parts, (2) mixing these parts with either water or a solution containing at least one ingredient, (3) applying at least one process such as infusion, shaking, vacuum infiltration and or heating, and (4) extending shelf life by adding at least one preservative, packaging, or storing at low temperatures. Processed foods are dead products but often still have some resemblance to the original raw food. Examples of processed foods include bread, potato chips, jam, sugar-infused strawberries, cucumber pickles, and orange juice.

The third group of products is derived from ingredients. The origin of these "highly-processed" group-3 products is often obscure. Examples include high-energy snacks and beverages, such as nutrition bars, power drinks, candy, and baked sweets such as cakes.

One disadvantage of processed and highly-processed dead foods is that their production consumes much energy (not just for processing but also for packaging, storage, and transport), and creates much waste. Furthermore, these foods lost at least part of their storability, texture, shape, and health-promoting activities (they may contain added vitamins and antioxidants that were synthesized or extracted in factories and that do not have the same health-promoting activities as the vitamins and antioxidants that are present in raw foods). Another disadvantage of processed and highly-processed foods is that they often contain preservatives and large amounts of sugar, salt, and/or fat. The frequent consumption of such foods may negatively affect health and contribute to a detachment of the consumer from his or her environment.

Despite the many disadvantages of producing and consuming processed and highly-processed foods, many consumers have become accustomed to their sophisticated taste and flavor profiles, and they have started to perceive raw foods as boring, bland and undesirable.

It is not reasonable to hope that breeding or genetic engineering will soon create crop varieties with greatly enhanced taste profiles. One of the few genetic traits linked to enhanced quality is the mutated sweet corn gene shrunken (sh). The recessive nature of this trait complicates efforts to introduce and express it in most vegetables and fruits, which have polyploid genomes. Furthermore, the benefit of increased sweetness is offset by the negative effect of sh on starch accumulation, which results in, for instance, reduced shelf life. Technical, regulatory, and perception issues have also impeded progress in genetic engineering. Apart from some transgenic oilseed crops with modified, supposedly healthier, fatty acid profiles, there are currently no successful quality improvements that have proven commercially viable.

Thus, the gradual replacement of raw, healthy and natural foods by (highly) processed and abstract foods represents one of today's most significant dietary issues. The present disclosure is directed toward one or more of the above issues.

SUMMARY

In accordance with one embodiment thereof, the disclosure provides a method for modifying a quality of a fruit. The method includes cutting a live stem attached to a live fruit at a cut distance from the fruit, producing a cut end of the stem. The method further includes contacting only the cut end of the stem with a solution comprising at least one mobile and quality-modifying food ingredient while protecting the fruit from contact with the solution, and keeping the cut end of the stem in contact with the solution for an incubation time sufficient to allow absorption and transport of the food ingredient into the fruit, the food ingredient conferring a modified quality upon the fruit.

In accordance with a more detailed embodiment thereof, cutting the live stem includes cutting a stem of a plant at a distance above a location of attachment of the fruit to the stem while the plant remains planted in ground, and contacting the cut end of the stem with the solution includes attaching a bulb to the cut end of the stem, the bulb containing the solution.

In accordance with another embodiment thereof, the disclosure provides an edible raw plant product. The edible raw plant product is an edible raw fruit, containing a detectable amount of at least one food ingredient that imparts a new quality to the raw fruit, and displaying a detectably modified quality compared to an edible raw fruit that does not contain within itself the detectable amount of the at least one food ingredient.

In accordance with yet another embodiment thereof, the disclosure provides a system for indirectly introducing at least one mobile and quality-modifying food ingredient into an edible raw fruit. The system includes a base, configured to contain a solution including the at least one mobile and quality-modifying food ingredient, and a holder, disposed above the base. The holder is configured to receive and support the edible raw fruit away from contact with the solution, with an attached to a portion of a stem of the edible raw fruit having a fresh cut surface, and the edible raw fruit being oriented such that a portion of the stem including the fresh cut surface is immersed in the solution.

BRIEF DESCRIPTION OF THE DRAWINGS

Additional features and advantages of the invention will be apparent from the detailed description which follows, taken in conjunction with the accompanying drawings, which together illustrate, by way of example, features of the invention.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present invention relates to a new field within food processing, which is referred to herein as non-lethal processing. The invention also relates to the field of chemistry, more specifically as it relates to mobile and quality-modifying ("momo-") ingredients, which are food ingredients with quality-modifying properties that are capable of being brought into solution and transported through the plant vascular system into a vegetable or fruit, either by themselves or with the help of other compounds, and that, when within that vegetable or fruit, can provide their modifying properties to that vegetable or fruit. Furthermore, the invention relates to an apparatus needed for the efficient non-lethal processing of multiple raw vegetables or fruits simultaneously, and it relates to raw vegetables and fruits that contain a least one of a modified taste, flavor, aroma, health-promoting activity, and/or stimulating activity.

The present invention presents a new approach, which employs the benefits of food processing while avoiding many of the disadvantages. This new approach can be used to adjust the sensory characteristics of raw vegetables and fruits to the modern palate (the benefit of processing) without being wasteful and without affecting the texture, shape, storability, portability, and nutritional value of such raw vegetables and fruits (the disadvantages of conventional processing).

The present invention addresses one of today's most significant dietary issues. Its application can increase the likeability of raw vegetables and fruits, especially among subgroups of the population, including children.

All references cited herein, are hereby incorporated by reference in their entireties, whether previously specifically incorporated or not.

Definition

Unless defined otherwise, all technical and scientific terms used herein have the same meaning as commonly understood by one of ordinary skill in the art to which this invention belongs. Generally, the nomenclature used herein, and the laboratory procedures described herein, are well-known and commonly employed in the art. The following definitions are specifically incorporated herein.

Acesulfame-potassium: a calorie-free sugar substitute (artificial sweetener), also known as Acesulfame K or Ace K. In chemical structure, acesulfame-potassium is the potassium salt of 6-methyl-1,2,3-oxathiazine-4(3H)-one 2,2-dioxide. It is a white crystalline powder with molecular formula $C_4H_4KNO_4S$ and a molecular weight of 201.24 g/mol.

Antioxidant: Naturally occurring ingredient, or derivative thereof, with antioxidant activities, such as anthocyanins and betalains (e.g., betanin, E162), and water-soluble carotenoids (e.g., norbixin).

Aromatic ingredient: Naturally occurring ingredient, or derivatives thereof, with aromatic activities, including, but not limited to, maltol and ethyl maltol (cotton candy aroma), methyl anthranilate (grape aroma), methyl salicylate (wintergreen oil), vanillin, lemon-lime extract, benzaldehyde, cinnamaldehyde, camphor, jasmine, limonene, and menthol. The water-solubility of many aromatic ingredients can be enhanced by complexing them with a cyclodextrin such as alpha-cyclodextrin, beta-cyclodextrin, random-methylated-beta-cyclodextrin, hydroxypropyl-beta-cyclodextrin.

Artificial food colorant: any ingredient that is approved for food use and selected from the group consisting of FD&C Blue No. 1 (Brilliant Blue FCF, E133), FD&C Blue No. 2 (Indigotine, E132), FD&C Green No. 3 (Fast Green FCF, E143), FD&C Red Nr 40 (Allura Red AC, E129), FD&C Red Nr 3 (Erythrosine, E127), FD&C Yellow Nr 5 (Tartrazine, E102), and FD&C Yellow Nr 6 (Sunset Yellow FCF, E110).

Artificial sweetener: any ingredient that is approved for food use and selected from the group consisting of sucralose, acesulfame-potassium, and saccharin.

Bulb: a balloon-shaped device made from a flexible and elastic material such as latex, rubber, or certain plastics that can contain a solution of at least one momo-ingredient, and that can be tightly attached to the stem so that the solution enters a living plant or plant tissue through the vascular system without leakage. The volume of a bulb in this invention is between about 0.5 ml to about 20 ml. The attachment of a bulb to the cut surface side of a stem-end is not labor-intensive, and it is possible for one person to attach hundreds of bulbs per hour.

Caffeine: bitter, white crystalline xanthine alkaloid that acts as a stimulant drug, extracted from the seed of the coffee plant and the leaves of the tea bush, as well as from yerba maté, guarana berries, guayusa, and the yaupon holly.

Sodium alginate: the sodium salt of alginic acid. Its empirical formula is $NaC_6H_7O_6$. Sodium alginate is a gum, extracted from the cell walls of brown algae, and widely used in foods as a stabilizer, thickener, and emulsifier.

Capsaicin: 8-methyl-N-vanillyl-6-nonenamide, is the active component of chili peppers, which are plants belonging to the genus *Capsicum*. It can be obtained at concentrations of ~16 million Scofield Heat Units per 5 g. Capsaicin and several related ingredients, such as dihydrocapsaicin, are called capsaicinoids and are produced as secondary metabolites. Because of the burning sensation caused by capsaicin when it comes in contact with mucous membranes, it is commonly used in food products to give them added spice (or heat or pungency). The American Association for Cancer Research reports studies suggesting capsaicin is able to kill prostate cancer and lung cancer cells by causing them to undergo apoptosis.

Carmine: a pigment of a bright-red color obtained from the aluminium salt of carminic acid (C22H20O13), which is produced by some scale insects, such as the cochineal scale and the Polish cochineal, and is used as a general term for a particularly deep-red color of the same name. Carmine is used as a food dye in many different products such as juices, ice cream, yogurt, and candy.

Carrot: specifies a plant, or the vegetable or fruit of that plant, belonging to the species *Daucus carota*.

Celery: specifies a plant, or the vegetable or fruit of that plant, belonging to the species *Apium graveolens*.

Chlorophyllin: the green, water-soluble sodium/cupper derivative of chlorophyll.

Compound: A compound is a chemical species that is formed when two or more atoms join together chemically, with covalent or ionic bonds. An ingredient is a compound.

Contact: the verb "contact" is used here to indicate that a cut stem surface is exposed to a solution containing at least one momo-ingredient. In case of the in vivo "detached" method, this exposure is usually accomplished by placing a raw material (including at least one vegetable or fruit with the physically connected stem-end(s)) with the cut stem surface downwards into a shallow solution such that (a) only a small part of the stem-end (about 0.1 to 1 cm) is immersed into the solution, and (b) the vegetable or fruit itself is not immersed into the solution. In case of the in vivo "detached" method, the exposure is usually accomplished by attaching a bulb containing about 1-20 ml of a solution containing at least one momo-ingredient to a freshly cut surface of a stem of a plant that is in the vicinity (within 1-50 cm) of at least one vegetable or fruit in such a way that the cut (a) does not prevent transport of water and nutrients from the bottom of the plant into the vegetable or fruit and (b) prevents the transport of nutrients from the top of the plant into the vegetable or fruit.

"Containing an momo-ingredient": refers to a plant, plant part, or vegetable or fruit that received an momo-ingredient through the vascular system that was contacted with a solution containing said momo-ingredient. Thus, the momo-ingredient is within the interior tissues rather than on the outside (surface) of the plant, plant part, or vegetable or fruit.

Cut/cutting: The cutting of a stem of either a plant or part of a plant is an essential aspect of the current invention. It is accomplished with a sharp knife to produce a clean and smooth cut that is at a 90-degree angle with the length of the stem (perpendicular to the stem). The cut surface is contacted, as soon as possible (e.g. within about 5-minutes but before the initiation of wound healing, which causes vascular blockage that limits or prevents the absorption of dissolved ingredients into the stem-end), with a solution containing at least one momo-ingredient.

Cyclodextrins are produced from starch by the action of cyclodextrin glycosyltransferase (CGTase), an enzyme produced by several organisms, Bacillus macerans being the earliest source. Structurally, Cyclodextrins consist of 6, 7, or 8 D-glucopyranosyl units connected by alpha-(1,4)glycosidic linkages. The most stable three dimensional molecular configuration for these non-reducing cyclic oligosaccharides takes the form of a toroid with the upper (larger) and lower (smaller) opening of the toroid presenting secondary and primary hydroxyl groups, respectively, to the solvent environment. The interior of the toroid is hydrophobic as a result of the electron rich environment provided in large part by the glycosidic oxygen atoms. It is the interplay of atomic (Van der Waals), thermodynamic (hydrogen bonding), and solvent (hydrophobic) forces that accounts for the stable complexes that may be formed with chemical substances while in the apolar environment of the cyclodextrin cavity.

"Detectable": measurable by at least one of the methods including (a) biochemical analysis using equipment such as High Performance Liquid Chromatography (HPLC), either alone or in combination with Mass Spectrometry (MS), Gas Chromatography (GC), either alone or in combination with MS, (b) sensory analysis, and (c) assessment of a stimulatory effect. It should be mentioned here that a "health-promoting effect" may not be immediately detectable. Such an effect is often assumed from the fact that an ingredient with a "health-promoting effect" has been consumed.

Dissolved ingredients are defined as either (a) molecular ingredients such as sugar or sucralose, whereby the bonds between molecules are broken when subjected to a dissolving agent, or (b) ionic ingredients such as salt, whereby the bonds between and within molecules were broken to produce ions when subjected to the dissolving agent. A solution containing dissolved compounds is transparent (as opposed to the opacity of suspensions) but not always colorless. It should be mentioned here that it is sometimes necessary to enhance solubility by using at least one dissolving aid.

Dissolving agent: a liquid used to dissolve an ingredient. The dissolving agent can be water. Other dissolving agents include, but are not limited to, ethanol, polyethylene glycol, propylene glycol, and a water solution containing 1 M potassium hydroxide (KOH).

Dissolving aid: a compound that helps increase the solubility of another compound. Examples of a dissolving aid include any compound selected from the group of (a) cyclodextrins, especially hydroxypropyl-beta-cyclodextrin, (b) polyethylene glycol (PEG), (c) propylene glycol, (d) ethanol, (e) bases, which increase the pH of a solution, such as potassium hydroxide, and (f) acids, which lower the pH of a solution, such as hydrochloric acid and citric acid.

"do not significantly affect": do not have a negative impact that greatly reduces applicability.

Effective/effectively: in a way that leads to an intentional result. For instance, "effective transport of a momo-ingredient into a vegetable" means that transport was such that it resulted in an intended modification of the quality of that vegetable.

Food ingredient or ingredient: any compound present in at least one raw or processed food. Examples of an ingredient include, but are not limited to, sugar, glucose, fructose, sodium chloride, acetic acid, fat, acesulfame-K, sucralose, and capsaicin.

Flavor: the taste of something of a food or other substance as experienced in the mouth, mainly the taste buds concentrated on the top of the tongue. The sensation of taste can be categorized into five basic tastes: sweetness, sourness, saltiness, bitterness, and umami. An additional flavor characteristic is pungency (hotness, spiciness) detected by chemesthesis. There are numerous ingredients that trigger a flavor experience. When added to a food, these ingredients can alter the flavor of that food. These flavor ingredients can either be natural or artificial. Flavor ingredients include, but are not limited to, (1) ingredients that are water-soluble, such as sucralose, acesulfame-K, neohesperidin dihydrochalcone, caffeine and (2) ingredients that can be complexed with a cyclodextrin to enhance solubility in water, such as allicin, benzaldehyde, bergamotte, capsaicin, cinnamaldehyde, camphor, citral, eugenol, menthol (from mint oil), and thymol.

Food processing: The prior art teaches various ways to process foods, all of which are destructive, which means that the edible parts of plants are killed through processes such as grinding, extensive cutting, heating, freezing, and/or drying. It is the intent of conventional processing methods to transform the harvested and edible raw (living) plant parts into dead food products that appear attractive to consumers, and often have long shelf-life. Because dead plant parts are extremely vulnerable to decay, processed food is often protected from such decay by (1) the addition of food preservatives, many of which display antimicrobial activities, such as sorbic acid, benzoic acid, calcium propionate, sodium nitrite, and sodium bisulfite, (2) providing a sterile environment, for instance by heating the food and then containing it, and (3) storing it at low temperatures, such as below 4 degrees Celsius and more particularly at about −20 degrees Celsius. Food processing is not meant to include methods that keep the edible parts intact, such as washing apples or strawberries before consumption, or sprinkling the edible food parts with flavors such as salt, pepper, or sugar. In this invention, the processing methods keep the edible organs of a plant alive.

Fruit: Any edible part of a plant or tree, including leaves and roots. As used herein, the term "fruit" is intended to encompass fruits, vegetables, and herbs, as those terms are commonly used.

*Ginseng*: Fleshy roots of any of 11 species of slow-growing perennial plants belonging to the genus *Panax* of the family Araliaceae. *Panax Ginseng* contains ginsenosides with potential health-promoting characteristics.

Harvesting: Methods that separate the edible parts of a crop from its non-edible parts, which may include the removal of skin or pod tissues or seeds.

Health-promoting effect: the positive effect of a phytochemical, or a compound derived thereof, on physical or emotional health, whereby the said phytochemical is selected from the group consisting of (a) capsaicinoids (e.g., capsaicin, dihydrocapsaicin, and nonivamide), gingerol, piperine, chavicine, and allyl isothiocyanates, caffeine, theobromine, theophylline, and ginsenosides, and (b) other bitter or pungent alkaloids, steroid glycosides, and triterpene saponins that have been shown by scientific experimentation to have a health-promoting effect.

Hydroxypropyl-beta-cyclodextrin: a non-toxic 7-membered sugar ring molecule that forms complexes with a large variety of compounds, including hydrophobic compounds such as capsaicin, thus increasing their solubility in aqueous solution. Solutions may be lyophilized to produce freely soluble powders.

in vivo "attached" method: a method to indirectly introduce at least one momo-ingredient into the edible part of a plant by contacting at least one stem physically connected with that edible part to a bulb or balloon filled with a solution containing at least one momo-ingredient.

in vivo "detached" method: a method to indirectly introduce at least one momo-ingredient into the edible part of a plant by detaching that edible part, together with at least one physically connected stem, from the plant, and contacting it to a solution containing at least one momo-ingredient.

Ingredient: a compound that is present in a plant-derived food, or that can be added to a plant-derived food, and that confers at least one quality to that food.

Infusion aid: a compound that facilitates the indirect introduction of at least one momo-ingredient into a vegetable or fruit. One example of an infusion aid is sucrose (about 0.2.g/ml), which is used to enhance the uptake of other compounds into tomatoes or other fruits. Furthermore, the indirect introduction can be enhanced with surfactants such as Silwet L-77.

"Indirect introduction into a vegetable or fruit" or, abbreviated, "indirect introduction": the intentional absorption of at least one momo-ingredient into the vascular system of a plant or plant part, such as by contacting a freshly cut stem with a solution containing at least one momo-ingredient, and the subsequent transport of at least part of the absorbed momo-ingredient(s) vascular transport through the vascular system into the inside of at least one vegetable or fruit. The indirect introduction may be accelerated, expedited, or enhanced by including at least one infusion aid to the solution.

Lettuce: specifies a plant, or the vegetable or fruit of that plant, belonging to the species *Lactuca sativa*.

Mobile: the ability of an ingredient to be translocated through the vascular system, from one place in a plant or plant part to another place in a plant or plant part, either by itself or facilitated by dissolving agents, dissolving aids, and infusion aids.

Mobile and quality-modifying (momo-) ingredient: an ingredient that (a) displays at least one taste, flavor, or aroma-modifying property, (b) can be dissolved in water and, as such, absorbed into a stem-end that is attached to a vegetable or fruit, (c) can be transported from that stem-end into the attached vegetable or fruit without being degraded or metabolized, and (d) can impart to that vegetable or fruit a noticeably-modified taste, flavor, or aroma without noticeably damaging that vegetable or fruit. Examples of momo-ingredients include, but are not limited to, natural colors, natural sweeteners such as steviosides, artificial sweeteners such as acesulfame-K and sucralose, naturally-occurring bitter or pungent alkaloids such as capsaicin, glycosides, and triterpene saponins, or derivatives thereof, with stimulating and health-promoting activities, naturally-occurring compounds, or derivatives thereof, with aromatic activities, naturally-occurring compounds, or derivatives thereof, with antioxidant activities, natural food colorants, and artificial food colorants. But momo-ingredients do not include many of the ingredients that are most frequently used in conventional processing, such as sucrose, fructose, glucose, sodium chloride, and acetic acid. Generally, the amount of a momo-ingredient in solution can be between 0.1 and 1000 mg/ml, and more particularly between 1 and 100 mg/ml.

Natural product: product that was produced without human involvement, or a similar product derived from said product by some chemical or physical process. For example, both neohesperidin and its derivative neohesperidin dichalcone are considered here as natural products, and so are chlorophyll and its sodium/copper derivative chlorophyllin.

Natural color: an ingredient selected from the group of carmine, norbixin, betanin, and chlorophyllin.

Natural sweeteners, selected from the group consisting of steviosides and neohesperidin dihydrochalcone.

New quality: a quality imparted to an vegetable or fruit by a detectable amount of at least one indirectly introduced momo-ingredient, whereby that quality was either weaker or absent before indirect introduction.

Non-lethal methods in raw food processing: processing methods that do not kill the raw food, i.e., that do not cut the raw food in small parts that easily die, that do not heat raw foods to temperatures that kill plant cells, that do not freeze raw foods, and that do not immerse raw foods into (or mix raw foods with) compounds such as acetic acid and sodium chloride at concentrations known to kill raw foods.

Non-toxic to a vegetable or fruit: not causing noticeable damage to a vegetable or fruit, whereby damage means necrosis or tissue collapse.

Norbixin: water-soluble derivative of bixin, the major apocarotenoid of annatto, which represents a group of yellow-orange carotenoids from the seeds of the achiote trees of tropical and subtropical regions, displaying, like most other carotenoids, antioxidant and health-promoting activities.

Noticeable: what can be noticed (seen, tasted, smelt, and/or felt) by a lay person without the need to use equipment. For example, "noticeable damage of a fruit" means that a lay person would see that a fruit has damage, and "a noticeable increase in sweetness" means that a lay person would taste that sweetness is increased.

Physically associated: when two different organs (including, but not limited to, stems, vegetables and fruits) are directly or indirectly connected in such a way that water and/or nutrients can be transferred from one organ to the other.

Quality: At least one characteristic of a vegetable or fruit that is selected from the group of characteristics consisting of taste, flavor, aroma, health-promoting activity, and stimulating activity.

raw vegetable: edible part of a raw vegetable or herbal plant. The raw vegetable can consist of at least part of one or more organs selected from the groups of organs consisting of a fruit (from, for instance, tomato, pepper, squash including zucchini, gourd, chard, melon, and cucumber), a flower (for instance, from broccoli), a leaf (for instance, from lettuce, spinach, and cabbage), a stem (for instance, from celery), a modified stem (for instance, the tubers from potato and the thickened stems from shallots), or a root (for instance, from carrot, radish, sweet potato, turnip, and parsnip).

Raw fruit: the edible part of a fruit plant including, but not limited to, the fruit of a strawberry plant, a blackberry plant, a currant plant, a grape plant, and a banana plant.

Raw herb: culinary herb, distinguished from vegetables in that, like spices, they are used in small amounts and provide flavor rather than substance to food. Examples include, but are not limited to the green tissues of parsley, mint, cilantro, dill, basil, oregano, rosemary, sage, thyme and marjoram.

Sensory analysis: assessment of a plant, plant part, or vegetable or fruit for at least one characteristic selected from the group consisting of color, flavor (bitter, sweet, salty, sour, and umami), aroma, and texture.

Silwet L-77: a nonionic organosilicone product with powerful wetting capabilities when used in aqueous applications.

Sink tissue: part of a plant that receives nutrients from source tissues. Most raw vegetables and fruits are sink tissues.

Source tissue: part of a plant that donates nutrients to sink tissues. Source tissues are often photosynthetically-active tissues, providing sugar, amino acids and other nutrients to sink tissues such as flowers, fruits, seeds, tubers, and roots.

Stem: above-ground part of a plant that is mainly meant for the transport of water and nutrients, and for support for, and the elevation of, leaves, flowers and fruits. A stem is usually green. Most plants have a single main stem and multiple smaller stems that arise from the main stem. Single stems can feed into single vegetables or fruits, as is the case for, for instance, most peppers, or can feed into multiple vegetables or fruits, whereby small stems named pedicels connect the stem with the multiple vegetables or fruits. It should be mentioned here that, in exceptional cases, the stem can be below ground. Such a stem is a modified stem, and an example of a modified stem is the potato tuber.

Stable: refers to ingredients that do not degrade or metabolize to such an extent that they cannot, upon indirect introduction into a vegetable or fruit, confer their quality-modifying property to that vegetable or fruit.

Stem-end: The stem-end is produced by applying a perpendicular cut to a stem; it includes the part of the stem from the cut surface to where it is physically connected to at least one vegetable or fruit, and has a length of about 1-100 cm. The freshly-cut surface of the stem-end is contacted with a solution containing at least one momo-ingredient so that the momo-ingredient(s) can be absorbed and transported through the vascular system into at least one vegetable or fruit. To clarify: in most cases, it is not necessary to contact the entire stem-end with a solution containing the momo-ingredient(s); it is often sufficient to only contact about 0.2-2 cm of the freshly-cut surface of the stem-end with the solution. The entire stem-end (or at least the part that was exposed to the solution) is usually removed prior to consumption of the processed raw food.

Stevia: dried extract from the leaves of Stevia rebaudiana, commonly known as sweetleaf, sweet leaf, sugarleaf, or simply stevia. As a sweetener and sugar substitute, stevia's taste has a slower onset and longer duration than that of sugar, although some of its extracts may have a bitter or licorice-like aftertaste at high concentrations. With its steviol glycoside extracts having up to 300 times the sweetness of sugar, stevia has garnered attention with the rise in demand for low-carbohydrate, low-sugar food alternatives. Because stevia has a negligible effect on blood glucose, it is attractive as a natural sweetener to people on carbohydrate-controlled diets.

Stimulating effect: the induction of temporary improvements in mental and/or physical function by a phytochemical selected from the group consisting of (a) capsaicinoids (e.g., capsaicin, dihydrocapsaicin, and nonivamide), gingeroil, piperine, chavicine, and allyl isothiocyanates, caffeine, theobromine, theophylline, ginsenosides, and theanine, and (b) other bitter or pungent alkaloids, steroid glycosides, triterpene saponins, and amino acids that have been shown by scientific experimentation to have a stimulating effect. Examples of a stimulating effect include enhanced alertness, wakefulness, and locomotion, among others.

Sucralose: heat-stable, artificial, non-toxic sweetener (1,6-dichloro-1,6-dideoxy-beta-D-fructofuranosyl-4-chloro-4-deoxy-alpha-D-galactopyranoside), that is approximately 600-fold sweeter than sugar. The majority of ingested sucralose is not broken down by the body, so sucralose is non-caloric.

Surfactant: compound that lowers the surface tension (or interfacial tension) between two liquids or between a liquid and a solid. In the context of this application, surfactants are used at concentrations that are not noticeably damaging to vegetables or fruits.

Systemic compounds: compounds that can be transported through the vascular system of a plant, with or without the use of one or more infusion aids. Most systemic compounds are involved in signaling or nutrition, and represent either plant-made organic molecules (such as sucrose and amino acids, transported mainly through the phloem from source to sink) or inorganic ions ($NO_3-$, $K+$, $Mg^{2+}$, etc., transported mainly through the xylem from roots upwards). Some man-made compounds, specific herbicides or insecticides, are systemic as well, as are the momo-ingredients described in this application.

Tomato: specifies a plant, or at least one fruit of that plant, belonging to the species *Solanum lycopersicon*.

Trait: a phenotype of the plant. In the context of this application, a trait is generally a trait of interest to a consumer, or a "consumer trait" selected from the group consisting of a flavor (sweet, bitter, pungent, sour, salty, or umami), an aroma, a color, a health-promoting activity, or a stimulating activity.

Transport: the process of translocating a compound from one place to another through the vascular system of a plant or plant part. In this application, the intended starting point of translocation is often at the cut surface of a stem that is exposed to a solution containing at least one momo-ingredient, and the intended end point of translocation is within the vegetable or fruit. The starting point can be above an vegetable or fruit, as is the case for, for instance, leaves feeding into a carrot root, or the stem of a truss feeding into tomato fruit, and the starting point can also be below an vegetable or fruit, as is the case for, for example, the stem base of a celery.

Vascular system: the main transport system of the plant, existing of xylem and phloem. A plant transports water and systemic compounds through its vascular system. In the context of this application, a vascular system does usually not imply the entire vascular system of the plant but rather the part of the vascular system between cut stem surface and vegetable or fruit.

Water-soluble beet extract: Extract (liquid or powder) from the roots of beet (*Beta vulgaris*) containing about 1% of the red-purple ingredient betanidin 5-O-beta-glucoside (betanin), which has both a phenolic and a cyclic amine group shown to function as good electron donors, thus acting as antioxidants. Beet extract is approved additives for use in food, drugs and cosmetic products.

Discussion

Plants are in constant interaction with their environment, mainly to take up nutrients from the air, water, and soil. Upon uptake, most of the nutrients are transported within the plants through the vascular system, either in their original inorganic ion form (such as salts) or after they are converted into plant-made organic molecules (such as sugars and signaling molecules). The vascular system is highly selective and limits or prevents the transport of most compounds that play no positive role in plant growth and development and that, instead, may be toxic to the plant.

However, the vascular system is not fail-proof, and chemists have been able to identify a small number of compounds that, even though they play no positive role in plant growth and development, are still taken up and transported effectively within plants. Some of these compounds are toxic to plants, insects, or fungi, and are used as herbicides, insecticides, and fungicides, respectively.

Food ingredients that can be taken up by plants and transported effectively through their vascular system have been identified. Such food ingredients are called "mobile ingredients" herein. Further, it has been found possible to apply mobile ingredients to the stems of a crop plant, and have them be transported, through the vascular system, into a vegetable or fruit of that crop plant. Such transport into a vegetable or fruit is referred to herein as "indirect introduction (into a vegetable or fruit)" because the vegetable or fruit itself was not contacted directly with the mobile ingredients.

It is considered desirable to avoid direct contact between a mobile ingredient and the vegetable or fruit because: (1) such contact is not expected to result in an effective uptake of the mobile ingredient because it is generally difficult for compounds to penetrate the skin of vegetables and fruits, (2) it has been a concern that any contact of the vegetable or fruit with the mobile ingredient (which means with a water-based solution) could cause water damage or rot, and (3) there is a need and interest in modifications of the quality of the inside rather than the surface of a vegetable or fruit.

Through indirect introduction into a vegetable or fruit, it has been found that certain substances can cause a modification of at least one sensory characteristic of that vegetable or fruit without noticeably damaging that vegetable or fruit. Such a modification of the quality of a vegetable or fruit implies that the mobile ingredient was not completely degraded or metabolized during transport, and that a sufficient amount was transported into the fruit to change the quality of that vegetable or fruit. Any mobile ingredient that, upon indirect introduction, is able to modify the quality of a vegetable or fruit, without noticeably damaging it, is referred to herein as a "mobile and quality-modifying ingredient", or, "momo-ingredient."

Candidate ingredients have been tested for their ability to move within the plant and modify the quality of a vegetable or fruit. It has been found that spray-application of the leaves with dissolved food ingredients (whereby uptake is facilitated with surfactants), or applying solutions containing these ingredients to the soil around the main stem (for uptake through the roots) do not yield satisfactory results. The taste of vegetables or fruits of the treated plants was not different from those of untreated plants.

In a different approach, a stem associated with (feeding into) at least one vegetable or fruit was cut and contacted with an ingredient. In one embodiment, this contact was accomplished by removing the stem-end with the attached vegetable(s) or fruit(s) from the rest of the plant, and immersing only the cut surface of that stem-end (i.e. not the vegetable or fruit itself) into a solution containing the ingredient. This is the in vivo "detached" method disclosed below with respect to FIGS. 1 and 2.

In an alternative embodiment, methods have been developed whereby the stem of a crop plant that remains planted in the ground is cut in the vicinity (e.g. within about 1-50 cm) of at least one vegetable or fruit in such a way that the cut (a) does not prevent transport of water and nutrients from the bottom of the plant into the vegetable or fruit and (b) prevents at least some of the transport of nutrients from the top of the plant into the vegetable or fruit. A bulb containing a solution including at least one momo-ingredient is attached to the cut surface so that part of the momo-ingredient will be transported through the vascular system into the nearby vegetable or fruit. The vegetable or fruit can be harvested after about 1 to 7 days and will contain some of the momo-ingredient and display a modified quality. This is the in vivo "attached" method, discussed below with respect to FIG. 3.

Notably, it has been found that contacting the actual vegetable or fruit itself with the solution containing the ingredient is undesirable, because such contact might cause water damage and rot, and because penetration of ingredients through the skin of vegetables and fruits is considered unlikely to be effective.

Various experiments were undertaken to identify suitable ingredients to introduce into a vegetable or fruit. Initial experiments with typical conventional ingredients such as sugar and glucose failed. It was found that the ingredients were absorbed by the cut stems but did not appear to change the taste of attached vegetables or fruits.

However, it was initially discovered that acesulfame-K can be absorbed into a cut stem surface and transported through the vascular system of a tomato plant into a fruit to impart its sweetness to the fruit. Useful amounts of acesulfame-K for solutions were found to be 3-300 mg/ml (0.3-30%) and more particularly 10-100 mg/ml (1-10%). This success showed that the basic concept of indirect introduction is possible, and other momo-ingredients were then identified. For example, sucralose and steviosides from *Stevia* represent momo-ingredients with sweetening activities. Useful amounts of these sweeteners for solutions can be 1-500 mg/ml (0.1-50%) and more particularly 5-100 mg/ml (0.5-10%).

Based upon the above and other experimentation, one embodiment of the invention provides methods to enhance the quality of a raw vegetable or fruit by introducing at least one momo-ingredient into a vascular system in ways that make it possible for the momo-ingredient(s) to be transported through that vascular system into the inside of the vegetable or fruit. In one embodiment, the indirect introduction is accomplished with the in vivo "detached" method. This method can include the following steps. Step (a): Prepare at least one solution containing (i) at least one momo-ingredient, and (ii) any compound selected from the group of compounds consisting of dissolving aids, dissolving agents and infusion aids needed to facilitate or enable vascular transport of the momo-ingredient(s).

Step (b): cut at least one vegetable or fruit, together with about 0.3-30 cm of its physically connected feeding stem (the "stem-end"), from the remainder of the plant (the vegetable or fruit with its physically connected stem-end is named here the "raw material"). Step (c): contact the freshly cut surface of the stem-end with at least one solution containing at least one momo-ingredient. Step (d): incubate for about 2-72 hrs, so that a sufficient amount of at least one momo-ingredient can be absorbed through the cut stem-end and transported through the vascular system and into at least one vegetable or fruit. The phrase "a sufficient amount" is intended to mean an amount sufficient to noticeably modify the quality of the at least one vegetable or fruit.

A suitable raw material for the in vivo "detached" method can be at least one fruit of a vegetable plant, including but not limited to, tomato, pepper, or squash, or a fruit of a fruit plant, including but not limited to, strawberry, or grape, with at least one stem-end. If a single fruit is attached to a single stem-end, as is the case for, for instance, pepper, the size of the fruit can be greater than 2 cm. If, on the other hand, multiple fruits are attached to a single stem-end, as is the case for, for instance, cherry tomatoes (FIG. 2) and grapes, the size of an individual fruit can be as small as 0.5 cm.

When the cut surface of the stem-end that is attached to a fruit is contacted with a momo-ingredient, the momo-ingredient is transported through the vascular system, from the stem into the truss: through the pedicel and receptacle, for unloading into the fruit. Not all of the momo-ingredient that is absorbed by the stem-end will eventually be translocated into the fruit; some will remain in, for instance, stem, pedicel, receptacle and sepals.

Figure 1:
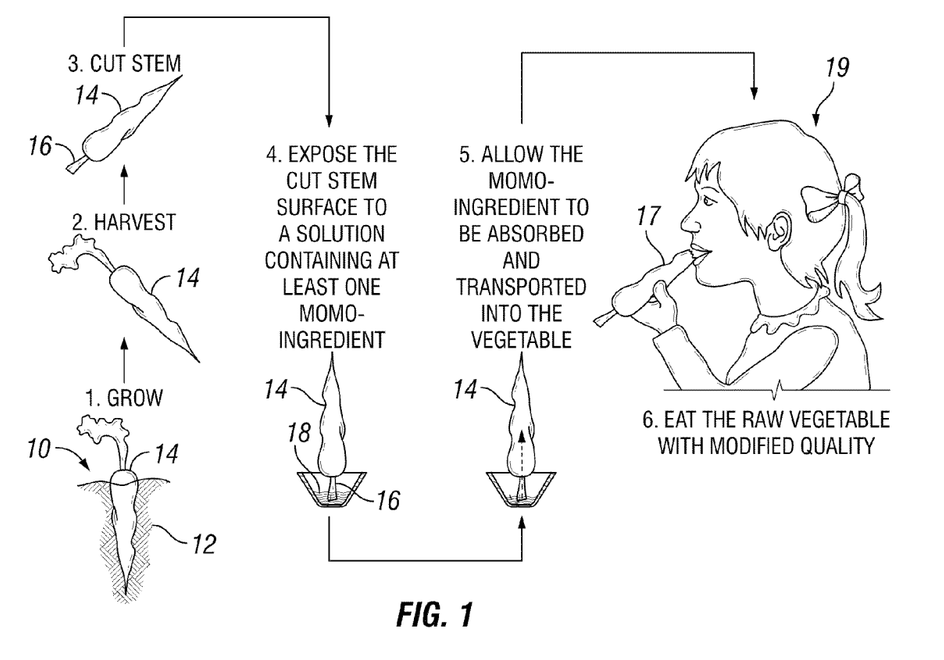
FIG. 1 is an illustration of an in vivo "detached" infusion method for cherry tomatoes.

Another suitable raw material for the in vivo "detached" method can include at least part of an edible organ of a vegetable plant whereby the organ is not a fruit, including, but not limited to a carrot root, celery stem, broccoli flower and lettuce leaf, that is still attached to at least one stem-end. If the raw material is a carrot root ("carrot"), the "remainder of the plant", which is the part that is not used for processing and consumption, is the foliage (FIG. 1). Because a single carrot is attached to multiple stem-ends, the cut surfaces of all of these stem-ends can be contacted with a solution containing at least one momo-ingredient. It is also possible to contact some cut surfaces with one solution and other cut surfaces with another solution. If, for instance, the different solutions contain different colorants, the treated carrot will display one color in one part and another color in another part. The use of multiple solutions makes it possible, as well, to indirectly introduce various momo-ingredients into carrot whereby the momo-ingredients cannot be dissolved together in a single solution.

In another embodiment of the in vivo "detached" method, the plant is celery, and the raw material is a stem (stalk) of celery. In this case, the method is modified as follows. Step (a): prepare a solution containing (i) at least one momo-ingredient, and (ii) any compound selected from the group of compounds consisting of dissolving aids, dissolving agents and infusion aids needed to facilitate or enable vascular transport of the momo-ingredient(s). Step (b): cut the celery within about 1-5 cm from the broad base where the various stems are connected. Step (c): contact the cut stem surface with the prepared solution. Step (d): incubate for about 2-72 hrs to allow absorption of the solution and transport of the solution upwards into the stem. Finally, step (e): cut away the cut stem surface that was contacted with the solution.

In yet another embodiment, indirect introduction is accomplished with the in vivo "attached" method by (1) cutting a stem in the vicinity (within about 1-50 cm) of at least one vegetable or fruit in such a way that the cut (a) does not prevent transport of water and nutrients from the bottom of the plant into the vegetable or fruit and (b) prevents at least some of the transport of nutrients from the top of the plant into the vegetable or fruit, (2) attaching a bulb that is filled with about 1 to 20 ml of a solution including at least one momo-ingredient to the cut surface, and (3) harvesting the vegetable or fruit about 1-7 days later.

One aspect of this invention relates to momo-ingredients, defined here as food ingredients that are water-soluble (with or without the aid of dissolving agents and/or dissolving aids), mobile, stable, non-toxic to a vegetable or fruit, and able to confer their taste-modifying property to a vegetable or fruit when indirectly introduced into that vegetable or fruit. One problem that was encountered was that many ingredients do not spontaneously dissolve in water. It was a challenge to identify dissolving agents and dissolving aids that helped get specific ingredients into solution and were not toxic to plants at the concentrations that would be used. It was quickly learned that small amounts (e.g. <5%) of the dissolving agent alcohol could be used, and that larger amounts would easily damage plant tissues. On the other hand, it was discovered that plant tissues were not easily affected by cyclodextrin dissolving aids such as alpha-cyclodextrin, beta-cyclodextrin, gamma-cyclodextrin, and hydroxypropyl-beta-cyclodextrin. These dissolving aids were particularly useful in bringing a number of food ingredients, including capsaicin, into solution. Additionally, it was discovered that some of the resulting complexes with cyclodextrin were accessible to vascular transport through the vascular system and into a vegetable or fruit.

One useful ingredient is capsaicin, which adds a desirable spiciness to certain vegetables and fruits if indirectly introduced into them. It was discovered that capsaicin can be brought into solution by complexing it with cyclodextrins, especially hydroxypropyl-beta-cyclodextrin, and that the resulting complex could be transported through the vascular system. It was also found out that sucrose and a small amount of surfactant, such as silwet L-77, help the unloading of the transported capsaicin into the fruits. It was amazing to taste, for the first time, spicy raw carrot and spicy raw celery. The spiciness is similar to that of Anaheim peppers (1,000-2,500 Scoville Units). A useful amount of capsaicin in solution can be about 0.1 to 100 mg/ml (0.01-10%), and more particularly about 1 to 10 mg/ml (0.1-1%).

The indirect introduction of momo-ingredients into fruits may be facilitated by adding small amounts of at least one of the following chemicals to the solution containing the momo-ingredient: L-77 (about 0.5-10 microliter/ml solution), sucrose (about 10-1000 mg/ml solution), and cyclodextrin (about 1-1000 mg/ml). The indirect introduction of momo-ingredients into vegetables or fruits may also be facilitated with mechanical or electronic means, for instance by using vacuum infiltration or pressure chambers, and/or by generating an electric field.

Suitable momo-ingredients include, but are not limited to: natural sweeteners, artificial sweeteners, naturally-occurring bitter or pungent alkaloids, steroid glycosides, and triterpene saponins, or derivatives thereof, with stimulating and health-promoting activities, naturally-occurring compounds, or derivatives thereof, with aromatic activities, naturally-occurring compounds, or derivatives thereof, with antioxidant activities, natural food colorants, and artificial food colorants. The above and other embodiments of the invention are discussed in more detail below.

In one embodiment, the vegetable or fruit provides a "healthy context" for delivery of at least one momo-ingredient with a health-promoting or stimulating activity to the consumer.

The new methods that have been developed to accomplish and test the uptake and transport of ingredients are more fully discussed below. In one embodiment, uptake is accomplished by the in vivo "detached" method, which is illustrated in FIG. 1. In the embodiment illustrated in FIG. 1, this method is applied to a carrot and proceeds according to the following steps. Step (1): a plant 10 is grown in soil 12. Step (2): the plant is harvested. Step (3): the fruit (carrot 14), together with a small part of its associated green stem 16, is detached from the remainder of the plant 10, and (4) only part of this stem 16 (not the fruit (carrot) 14 itself) is contacted with a water-based solution 18 containing at least one potentially-mobile ingredient that has a quality-modifying property. Step (5): after incubation for a suitable time, such as at least 2 hours, during which the potentially-mobile ingredient can be absorbed and transported through the vascular system of the stem 16 into the carrot 14, producing a modified fruit (carrot) 17, the stem 16 can be removed. Step (6): the modified fruit (carrot) 17 is then ready for consumption by a user 19, and can be evaluated for sensory attributes to determine whether or not it has the desired modified quality. The modified fruit 17 will desirably have taken on a new quality that depends on the characteristics of the momo-ingredient.

Figure 2:
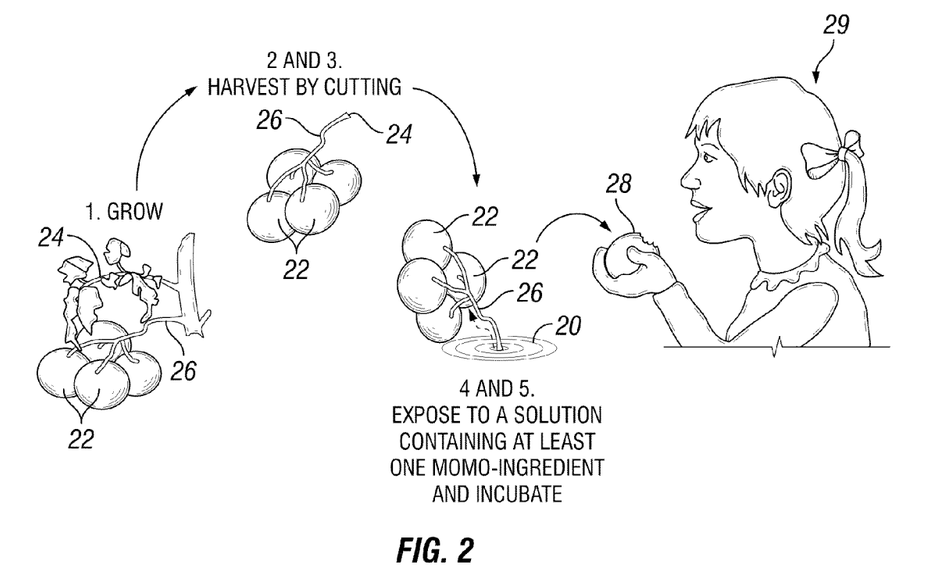
FIG. 2 is an illustration of an in vivo "detached" infusion method for a carrot.

An example of the in vivo "detached" method for a tomato plant is shown in FIG. 2. This method can proceed according to the following steps. Step (1): Prepare at least one solution 20 containing at least one momo-ingredient (or potential momo-ingredient). Step (2): cut at least one edible raw fruit with a suitable part of the associated feeding stem (e.g. about 1-30 cm) from the remainder of the plant. This step is shown in FIG. 2, where a cluster of cherry tomatoes 22 are cut from the remainder of the plant 24. Step (3): contact the exposed surface 24 of the cut stem 26 with the at least one solution 20. This step is shown in FIG. 2 where the cut stem surface 24 of the cluster of tomatoes 22 is placed into the momo-ingredient solution 20. In the case shown, the stem 26 that is used to contact the solution 20 feeds into multiple tomato fruits 22 (it is also possible to use the smaller stems (pedicels) that feed into single tomato fruits for contacting). Step (4): incubate for a suitable time (e.g. about 4-72 hours) to allow uptake of the momo-solution into the plant tissue, so that the single fruit or multiple fruits 22 will receive a detectable amount of at least one momo-ingredient. The modified fruit (cherry tomato) 28 can then be consumed by a user 29. The modified fruit 28 will have taken on a new quality that depends on the characteristics of the momo-ingredient.

Figure 3:
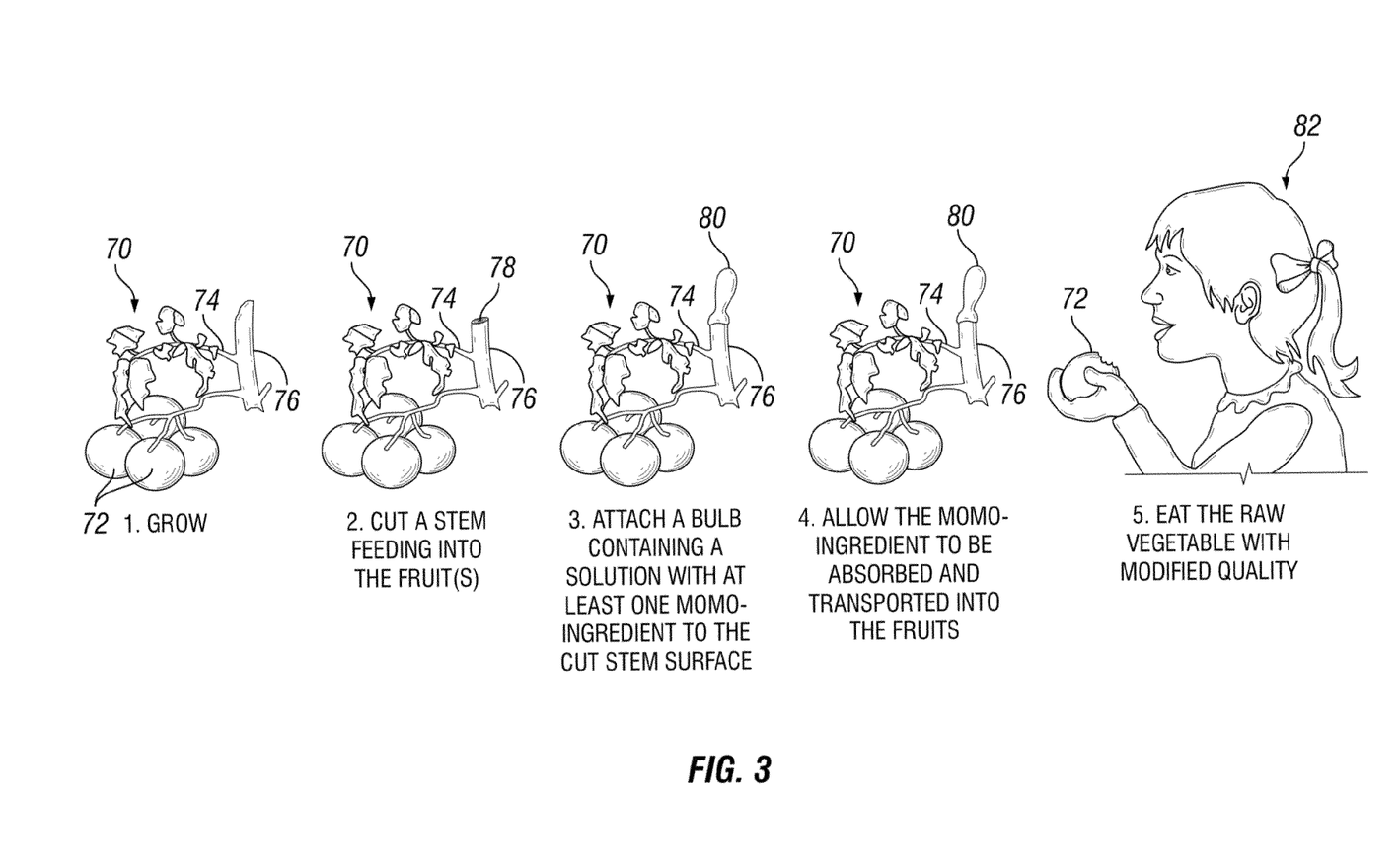
FIG. 3 is an illustration of an in vivo "attached" method for infusing a tomato.

In yet another embodiment, uptake of a momo-ingredient can be accomplished by an in vivo "attached" method, in a manner depicted in FIG. 3. This figure shows a series of views of a cluster 70 of cherry tomatoes 72, attached to their native tomato plant 74, which includes a main stem 76. In this approach, uptake is accomplished by cutting the main stem 76 about 1-30 cm away from the fruit (i.e. 1-30 cm away from the cluster 70 of cherry tomatoes 72), leaving a cut surface 78 of the main stem 76. It is desirable that cutting of the main stem be done in such a way that water transport through the xylem towards the fruit (70, 72) is not affected. A flexible, elastic bulb 80 that is filled with about 1 to 10 ml of a solution including at least one momo-ingredient is then attached to the main stem 76 over the cut surface 78. With this bulb 80 in place, the fruit 72 will take up detectable amounts of at least one momo-ingredient after an incubation time of about 4-72 hours. The modified fruit 72 will have taken on a new quality that depends on the characteristics of the momo-ingredient, and will be suitable for consumption by a user 82.

It will be appreciated by those of skill in the art that the method disclosed herein can be performed within a wide range of equivalent parameters, concentrations and conditions, without undue experimentation. This disclosure is intended to cover any variations, uses, or adaptations of the invention, following in general the principles of the invention, that include such departures from the present disclosure as come within known or customary practice within the art to which the invention pertains and as may be applied to the essential features hereinbefore set forth.

EXAMPLES

The following examples serve to illustrate various embodiments of the present invention and should not be construed, in any way, to limit the scope of the invention.

The examples are not exhaustive. There are numerous ways to enhance the quality of an vegetable or fruit through the indirect introduction of at least one momo-ingredient into that vegetable or fruit.

Example 1

Initial Experiments

Sugar is a food ingredient that is most frequently and abundantly added during conventional food processing. It is not only a great sweetener, but is also not toxic to plants, is water-soluble and vascular-mobile, and, therefore, would seem to be an ideal ingredient to use to test the possible efficacy of potential methods for raw food processing. Indeed, there are some prior methods that have used sugar, glucose and fructose to sweeten fruits. After extensive experimentation, however, it was found that sugar that is exogenously applied, in accordance with the methods disclosed herein, to the vascular system of a tomato plant, for example, does not enhance the sweetness of its fruits. There are also known methods that introduce various chemicals (e.g. herbicides, pesticides, etc.) into a plant by spraying them on leaves or applying them to roots. After experimentation, it has also been found that the suitable momo-ingredients disclosed herein do not, at this time, appear to be effectively introduced into a plant by spraying them on leaves or applying them to roots.

A breakthrough was accomplished when Acesulfame-K was tried, using the in vivo "attached" method discussed above. About two days after the onset of the experiment, it was noticed that leaves positioned between the cut stem surface and the fruits were sweet. And a few days later, this sweetness could also be noticed in the fruits themselves. These were observed to be very sweet tomatoes.

Some children who disliked eating tomatoes were asked to taste the Acesulfame-K-containing fruits. They did and reported that these were the first tomatoes ever that they liked because they were so sweet.

Similar methods were used to sweeten carrots using the "detached" methods discussed above. The foliage of carrot plants was removed in such a way that the carrot roots (carrots') still contained stem ends of about 5 cm. The carrots were then inverted so that the stem ends were pointing downwards, and parts of these stem ends (~1 cm at the cut stem surface side) were immersed into a solution containing Acesulfame-K. Any direct contact between the carrots themselves and the solution was avoided. After overnight incubation, it was noticed that each carrot had absorbed about 2 ml of the solution. The carrots were tasted and found to be sweeter than untreated carrot controls. Even sweeter carrots were obtained when air was blown towards the foliage with a fan for about 1 hour before cutting. This partial blow-drying may have resulted in some water loss through evaporation, so that there was a greater need to absorb the solution through the stem into the carrot. Whatever the reason, it was discovered that the partial blow-drying can increase the indirect uptake of a momo-ingredient by about 5 to 10-fold.

Celery was also sweetened using the "detached" methods discussed above, by cutting celery stalks at the base and contacting the freshly cut stem end to a solution containing at least one of Acesulfame-K and sucralose. Some more detailed protocols for the sweetening of raw vegetables and fruits are provided in Example 4.

Example 2

Some Options to Modify the Quality of Raw Foods

Figure 4:
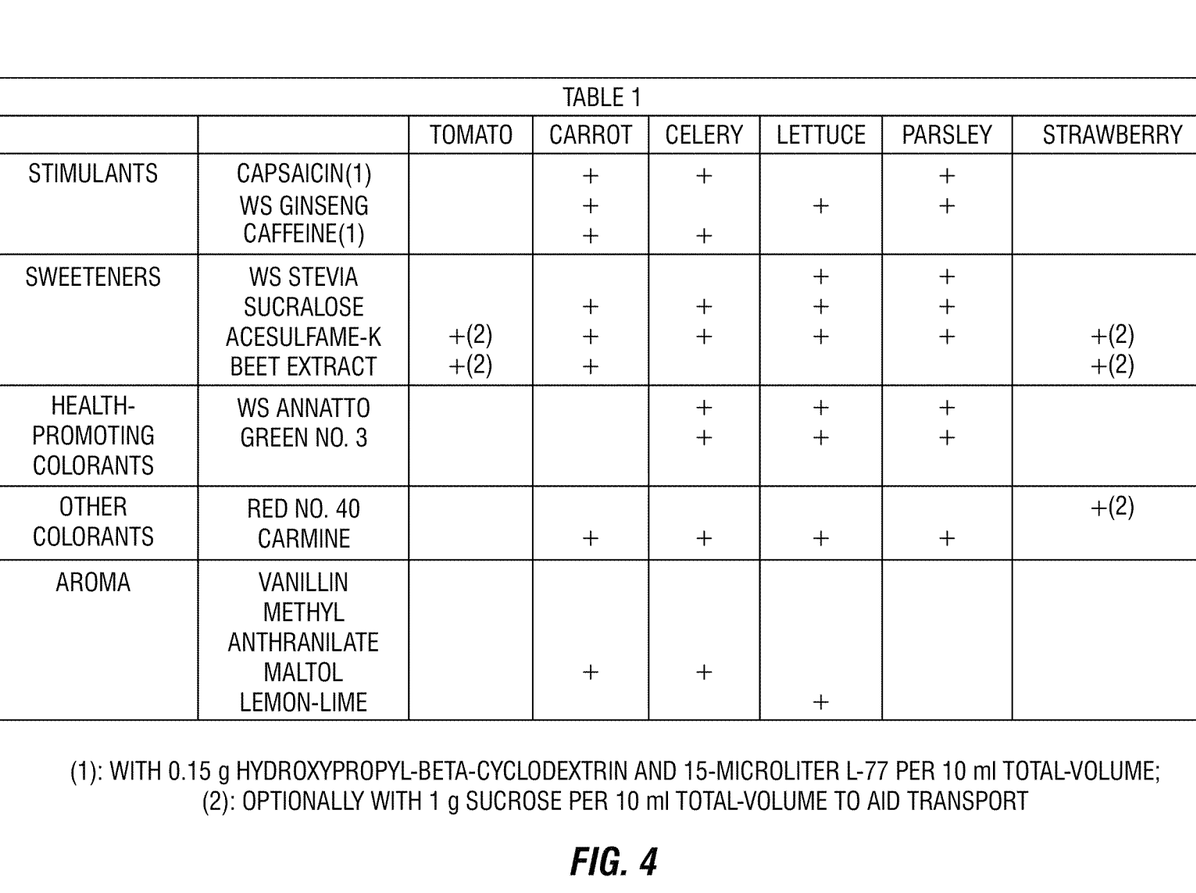
FIG. 4 is a table ("Table 1") showing the suitability of a variety of combinations of raw vegetables and fruits and momo-ingredients.

There are numerous ways to enhance the quality of a fruit through the uptake of solutions containing at least one momo-ingredient. Provided in FIG. 4 is Table 1, which shows a variety of combinations of fruits and momo-ingredients. The symbol "+" in Table 1 indicates a particularly suitable fruit-momo-ingredient combination. Detailed protocols are provided in subsequent examples.

The momo-ingredients used in the examples disclosed herein were obtained from readily available commercial sources. Capsaicin was obtained as ~16 million Scofield Heat Units per 5 gram; *Panax Ginseng* containing 7% ginsenosides (NuSci) was obtained from HerbStoreUSA (Walnut, Calif.); Caffeine was obtained from Sigma-Aldrich; Dried *Stevia rebaudiana* leaf extract was obtained from NOW FOODS (Bloomingdale, Ill.); Sucralose was obtained from Muscle-Empire; Acesulfame-potassium was obtained from Prescribed for Life (Fredericksburg, Tex.); Water-soluble red beet extract, containing 1% betanin, was obtained from DDWilliamson (Port Washington, Wis.); Water-soluble annatto, containing 3.8% norbixin, was obtained from DDWilliamson (Port Washington, Wis.); Artificial food colorants were obtained from McCormick (Hunt Valley, Md.); Silwet L-77 was obtained from Helena Chemical Company (Collierville, Tenn.); Hydroxypropyl-beta-cyclodextrin (Trappsol) was obtained from Cyclodextrin Technologies Development, Inc.; Carmine was obtained from Pronex S.A. (Lima, Peru); and Lemon-Lime flavor concentrate, also containing propylene glycol and ethanol, was from Capella Flavors, Inc. (San Marcos, Calif.).

Example 3

Raw Spicy Carrots and Tomatoes

A method for the indirect introduction of at least one momo-ingredient into carrot roots ("carrots") to create a spicy raw carrot can include the following steps. Step (a): Prepare solution A. For a total of 10 ml, start with 8 ml water, though much larger volumes are likely for commercial production. In particular, it can be expected that each carrot will absorb at least 1-5 ml. (i) Add 0.15 g g hydroxypropyl-beta-cyclodextrin and shake until dissolved, (ii) add about 0.03 g capsaicin, and shake until dissolved (facilitated by heating), (iii) add 0.1 g caffeine and shake until dissolved, (iv) add 0.1 g *stevia*, and shake until dissolved, (v) add 0.03 g sucralose, and shake until dissolved, (vi) add 15 microliter L77 and shake gently, (vii) add 1 ml beet extract, and shake gently, (viii) add water to a final volume of 10 ml.

Step (b): use, as starting material, fresh carrots, such as small or mid-sized (about 10-25 cm), with their leaves still attached. The carrots may have been cold-stored but should still have fresh-looking green tops. Step (c): air-dry the carrot bunches, such as by using a fan, for a sufficient period of time, e.g. about 1-hr or until the leaves start wilting, before and/or during the start of the indirect introduction process. In this way, moisture is mobilized from root to leaves, thus lowering the water potential of the carrot.

Step (d): cut the leaves to about 1-cm from the root bases, and invert the carrots in such a manner that stem ends are immersed into solution A, (e) incubate for a suitable period of time, e.g. about 16-32 hrs, and sample a carrot by slicing it open to confirm that the inner core has a dark purple color.

The processed raw carrots absorb about 0.1-10.0 ml solution A, have a purple core, and taste sweet and spicy. They also contain a new health-promoting antioxidant, betanin, as well as caffeine. Processed raw carrots represent good snacks for truck drivers, night workers, and anyone else who wants to eat a healthy and tasteful food that can help keep them alert and awake.

The creation of vegetables and fruits with novel natural colors by indirect introducing natural dyes into vegetables and fruits is surprising because most natural colors are not efficiently translocated through the vascular system. For instance, raw vegetables and fruits are not colored effectively when their physically connected stems are contacted with elderberry extracts, which contain specific anthocyanins as natural coloring agent. Other natural colorants that are not transported effectively through the vascular system include carotenoids and chlorophyll. Betanin is a suitable natural colorant, as are carmine, carminic acid, and pronixin.

The sweetening of vegetables and fruits through indirect introduction of sweeteners is surprising as well. It is surprising that sucralose, acesulfame K and *stevia* are not only transported through the vascular system, often with hardly if any need for aids, but also that they are not completely degraded or metabolized and that they are powerful enough to confer their quality-modifying properties to vegetables and fruits. However, this is not the case for many other potent sweeteners such as saccharin, aspartame, xylitol, sucrose, glucose, and fructose.

The transport of non-sweetener flavoring ingredients is a result that would not ordinarily be expected. Capsaicin is not transported effectively when simply dissolved in water; it needs to be physically connected with a solution aid such as hydroxypropyl-beta-cyclodextrin and, optionally, an infusion aid such as L-77.

It is possible to change the composition of solution A in various ways, provided that the solution still contains at least one momo-ingredient. It should be mentioned that the indirect introduction of caffeine (from a solution with hydroxypropyl-beta-cyclodextrin and L-77 to enhance solubility of caffeine in cold water as well as aid its transport into the root) results in bitter products. Thus, it may be desirable to indirectly introduce both caffeine and a sweetener such as sucralose into a vegetable or fruit, whereby the sweetener not only functions to enhance sweetness, but also, and especially, masks bitterness.

Shown in FIG. 5 are various views of raw fruits and vegetables that have been infused to obtain a modified color, and then sliced to reveal the inside color. FIG. 5A shows the results of indirect introduction of beet extract into carrot. This is a sliced view of a carrot 100 that has been modified with a solution containing beet extract, which contains the natural colorant betanin. The color of the beet extract and its quality-modifying behavior upon uptake into the carrot 100 is visible in the carrot core 102, which has taken on a deep purple color from the beet extract.

One method for production of salsa tomatoes is as follows. Step (a): start with preparing solution B: (i) for a total volume of 10 ml, use 8 ml water, (ii) add 0.2 g hydroxypropyl-beta-cyclodextrin and shake until dissolved, (iii) add 0.03 g capsaicin, and shake until dissolved (facilitated by heating), (iv) add 1.0 g sucrose, and shake until dissolved, (v) add 15 microliter L77 and shake gently, (vi) optionally, add 1 ml beet extract, and shake gently, (vii) optionally, add 0.2 g acesulfame-K, (viii) ensure a final volume of about 10 nil.

Step (b): use trusses with immature tomatoes (green to orange), as fresh as possible. It is desirable that the truss is still connected to a stem. Optionally, treat trusses with immature tomatoes (green/orange) with 500 ppm NAA to stimulate development of the vascular system prior to being harvested.

Step (c): there are many ways to contact the truss with solution B, for instance, (i) remove the truss together with a stem piece of a suitable length, e.g. about 10-20 cm, cap-off one of the stem ends, such as the upper end with, for instance, parafilm, and attach a bulb containing solution B (e.g. at least 1.5 ml) to the other end of the stem (in the manner illustrated in FIG. 3), (ii) cut the truss within about 1 cm from the attached stem, and contact the truss with solution B (e.g. in the manner illustrated in FIG. 1 or FIG. 2), and (iii) cut a stem above where it feeds into a truss (e.g. about 2-10 cm above), and attach a bulb containing solution B (e.g. at least 1.5 ml) to the cut stem end (in the manner illustrated in FIG. 3). Step (d): incubate for a sufficient period of time, e.g. about 32-72 hrs, until the tomato fruits start to taste pungent and, optionally, taste sweet and show purple.

Example 4

Raw Sweetened Vegetables and Fruits ("Living Candy")

Many children would eat more raw vegetables and fruits if they would be sweeter. Such very sweet vegetables provide a healthy alternative to candy, especially if the added sweetness is provided by natural or artificial low-calorie sweeteners. Suitable sweeteners include, but are not limited to, sucralose, acesulfame-K, and steviosides. It should be mentioned here that sucrose is a poor sweetener and not used as momo-ingredient in this invention. Its utility is limited to facilitate the transport of other ingredients of interest.

A method for the indirect introduction of momo-ingredients into carrot to create a sweetened raw carrot can include the following steps. Step (a): prepare solution C (i) start with 9 ml water, (ii) add 0.1 g *stevia*, and shake until dissolved, (iii) add 0.03 g sucralose, and shake until dissolved, (iv) optionally, add a color (1 ml beet extract, or 1 ml water containing a water-soluble food-grade colorant such as Allura Red AC or Erythrosine, or carmine dissolved in 1 M KOH) and shake gently, (v) ensure a final volume of about 10 ml.

Step (b) use fresh carrots with the leaves attached as starting material. The carrots may have been cold-stored but should still have fresh-looking green tops. Step (c) air dry the carrot bunches, such as by using a fan, for about 1-hr or until the leaves start wilting. In this way, moisture is mobilized from root to leaves, thus lowering the water potential of the carrot. Step (d) cut the leaves to about 1-cm from the root bases, and invert the carrots in such a manner that stem ends are immersed in solution C. Step (e) incubate for a sufficient period of time, e.g. about 16-32 hrs, until the carrots are very sweet and the inner cores are colored.

It is possible to change the composition of solution C in any way, provided that the solution still contains at least one momo-ingredient.

A method for the indirect introduction of momo-ingredients into tomato fruit ("tomato") to create a sweetened tomato can include the following steps. Step (a): prepare solution D: (i) start with 9 ml water, (ii) add about 0.4 g acesulfame-potassium, and shake until dissolved, (iii) add 1.0 g sucrose, and shake until dissolved, (iv) add 15 microliter L77 and shake gently, (v) optionally, add a color (1 ml beet extract, or 1 ml water containing a water-soluble food-grade colorant such as Allura Red AC or Erythrosine, or carmine dissolved in 1 M KOH) and shake gently, (vi) ensure a final volume of about 10 ml, Step (b): use trusses with immature tomatoes (green to orange), as fresh as possible. Step (c): make a fresh stem cut at the top of the truss, near where the truss is attached to a main stem, and (i) place the cut surface in a small container with at least 1.5-ml solution D or (ii) attach a small ~2-ml bulb filled with solution D to the cut surface (see FIG. 3). Step (d): incubate for a sufficient period of time, e.g. about 32-72 hrs, until the tomato fruits start to show the colorant and taste sweet.

It should be mentioned here that sucrose is not used to enhance sweetness but rather to facilitate intake of other momo-ingredients into the fruit. It is possible to change the composition of solution D in any way, provided that the solution still contains at least one momo-ingredient. The efficiency of indirect introduction is variety-dependent. For instance, the variety "Rutgers", which produces vigorous trusses, is more suitable to indirect introduction than some of the varieties that yield cherry tomatoes with relatively weak trusses.

Figure 5A:
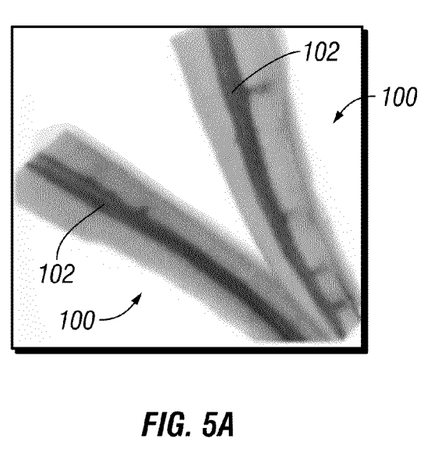
FIG. 5A is an illustration showing a carrot infused with a solution containing 10% beet extract.
Figure 5B:
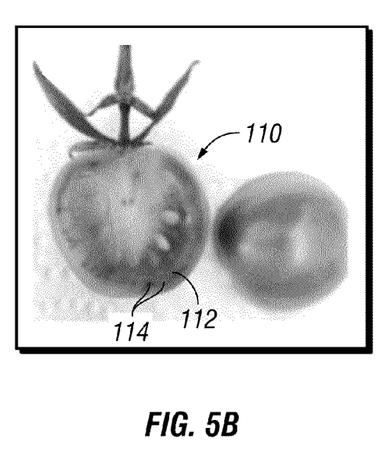
FIG. 5B shows a tomato fruit infused, according to the in vivo "detached" method, with a solution containing 10% beet extract.

Shown in FIG. 5B are the results of the indirect introduction of beet extract into an unripe tomato fruit 110, whereby the in vivo "detached" method was used with a solution containing 10% beet extract. The color of the beet extract and its quality-modifying behavior upon uptake into the tomato 110 is visible in the pericarp 112 and vascular bundle 114, which have taken on the color from the beet extract to various degrees, providing a slightly mottled appearance in this example.

A method for the indirect introduction of momo-ingredients into celery stem ("celery") to create a sweetened celery can include the following steps. Step (a): prepare solution E: (i) start with 9 ml water, (ii) add 0.1 g sucralose, and shake until dissolved, (iii) add FD&C Green No. 3, and mix gently, (iv) optionally, pungency can be included by adding 0.15 g g hydroxypropyl-beta-cyclodextrin, 15 microliter L-77 and 0.03 g capsaicin, and shaking until dissolved, (v) ensure a final volume of about 10 ml.

Step (b): Use fresh celery, such as with some parts of the leaves still attached, as starting material. It may be beneficial to lower the celery's water potential by stimulating the evaporation process, for instance, by using a fan to blow air towards the celery for about 1-4 hours before and/or during processing. The lower water potential in the celery can increase the efficiency of indirect uptake by five-fold or more.

Step (c): cut the stems to about 1-cm from the bottom, and expose the about 2-4 cm cut surface to solution E. Step (d):

incubate for a sufficient period of time, e.g. about 4-24 hrs, until the celery stems contain colored veins and taste sweet. It is possible to change the composition of solution E in various ways, provided that the solution still contains at least one momo-ingredient.

A method for the indirect introduction of momo-ingredients into lettuce leaf ("lettuce") to create a sweetened raw lettuce can include the following steps. Step (a): prepare solution F: (i) start with 9 ml water, (ii) add either 0.1 g sucrolase (very sweet) or 0.15 g stevia (sweet), and shake until dissolved, (iii) add FD&C Green No. 3, and mix gently, (iv) optionally, pungency can be included by adding 0.15 g g hydroxypropyl-beta-cyclodextrin, 15 microliter L-77 and 0.03 g capsaicin, and shaking until dissolved, (v) ensure a final volume of about 10 ml.

Step (b): use as starting material fresh lettuce from a variety such as "Romaine", such as with the leaves still attached to their above-ground base. It may be beneficial to lower the lettuce's water potential by stimulating the evaporation process, for instance, by using a fan to blow air towards the lettuce for about 10 minutes to several hours during processing. The lower water potential in the lettuce can increase the ability of lettuce to take up solution F.

Step (c): expose the freshly cut base to solution F. Step (d): incubate for a sufficient period of time, e.g. about 4-16 hrs, until the celery stems contain colored veins and taste sweet. It is possible to change the composition of solution F in various ways, provided that the solution still contains at least one momo-ingredient.

"Indirect introduction" such as those described here for carrot, tomato, celery, and lettuce can also be used to sweeten other vegetables including, but not limited to, the fruits of pepper, squash including zucchini, gourd, chard, melon, and cucumber, the flowers of cauliflower and broccoli, the leaves of spinach and cabbage, the modified thickened stem of onion, shallot, and potato, and the root of radish, sweet potato, turnip, and parsnip.

Example 5

Raw "Rainbow" Celery

A suitable method for rainbow celery production can include the following steps. Step (a): prepare three solutions. Solution G contains, per 8.5 ml, 0.15 g hydroxypropyl-beta-cyclodextrin, 0.05 g capsaicin, 7 drops green, and 15 microliter L77; solution H contains, per 5 ml, 2.5 ml supernatans from 0.8 g ginseng (with 7% ginsenosides), 0.2 g stevia, 0.05 g acesulfame-K; solution I contains, per 10 ml, 0.15 g hydroxypropyl-beta-cyclodextrin, 0.1 g maltol, 0.1 g caffeine, 0.5 ml annatto (3.8% norbixin), 0.04 g carmine dissolved in 0.5 ml 1 M KOH, 0.5 g sugar, and 15 microliter L77.

Step (b): place the solutions in three different compartments of a gridded box, whereby the dividing walls are thin and sharp and about 1.5 cm apart. Step (c): place the fresh and optionally air-dried celery stems in the box such that the bases of the left, middle, and right part of the stem bases are divided and each exposed to one of the three solutions. Step (d): incubate for a sufficient period of time, e.g. about 8-24 hrs.

In one experiment, each celery stalk absorbed, on average, 1 ml solution G, 2 ml solution H, and 0.5 ml solution IA. This means that the stalk contained, among other things, about 20 mg ginsenosides, 5 mg caffeine, and 1 mg norbixin.

Figure 5C:
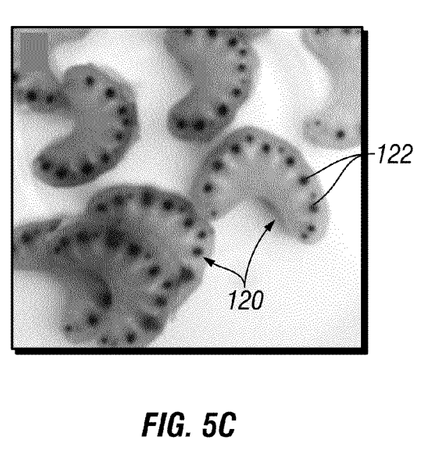
FIG. 5C is an illustration of celery infused with a solution containing 10% water-soluble carminic acid.
Figure 5D:
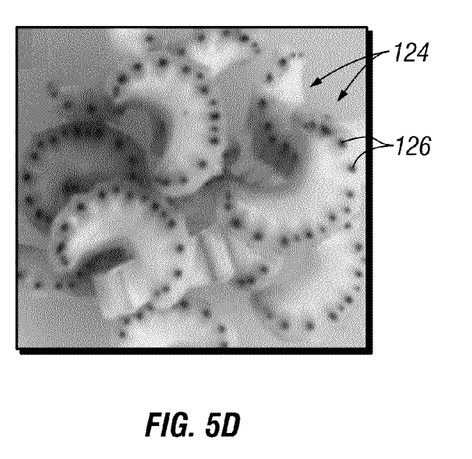
FIG. 5D is an illustration of celery infused with two different solutions, containing 5 drops colorants, Green no. 3 and Red no. 40, respectively, per 10 ml.

In other experiments, celery was contacted with one of several different momo-ingredient compounds. Shown in FIG. 5C is a view of multiple sections of celery stalk 120 that have been contacted with a solution containing 10% water-soluble carminic acid. The carminic acid changes from a red to black color during transport. Coloring from the carminic acid that was taken up is most visible in the vascular bundle 122 of the celery stalk 120. Shown in FIG. 5D is a view of multiple sections of celery stalk 124 that have been contacted with two different solutions, containing 5 drops colorants, Green no. 3 and Red no. 40, respectively, per 10 ml. Coloring from the green and red colorant that was taken up is most visible in the vascular bundle 126 of the celery stalk 124.

Figure 5E:
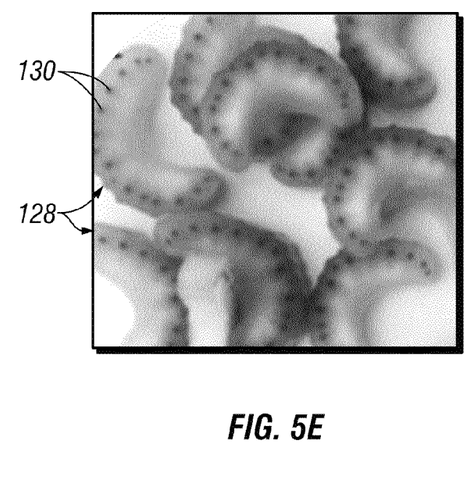
FIG. 5E is an illustration of celery infused with a solution containing 0.05 g carmine dissolved in 1 ml of 1 M KOH, diluted to 10 ml with water.
Figure 5F:
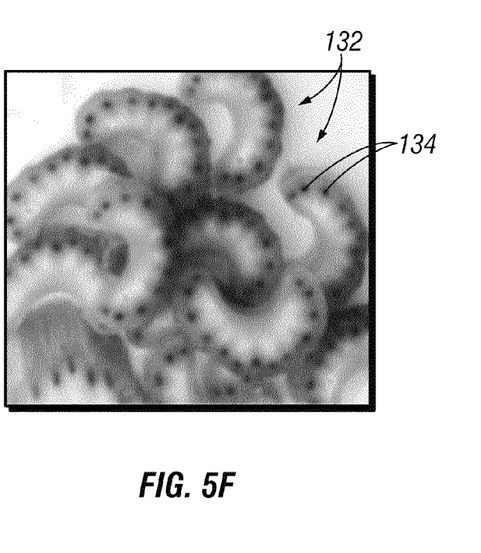
FIG. 5F is an illustration of celery infused with a solution containing 10% water-soluble beet extract.

Shown in FIG. 5E is a view of multiple sections of celery stalk 128 that have been contacted with a solution containing 0.05 g carmine dissolved in 1 ml 1 M KOH, diluted to 10 ml with water. Coloring from the carmine and KOH solution that was taken up is most visible in the vascular bundle 130 of the celery stalk 128. Shown in FIG. 5F is a view of multiple sections of celery stalk 132 that have been contacted with a solution containing 10% water-soluble beet extract. Coloring from the beet extract that was taken up is most visible in the vascular bundle 134 of the celery stalk 132.

Example 6

Other Examples of Raw Vegetables and Fruits with Modified Quality

The fruits of pepper, squash, gourd, chard, melon, and cucumber can be sweetened as well, using methods similar to those described for tomato: the stem feeding the vegetable or fruit needs to be cut and exposed to a solution containing at least one momo-ingredient. However, squash, gourd, chard, melon, and cucumber have thicker stems than tomato, which, in case the in vivo "attached" method is used, can involve the application of larger bulbs with volumes of about 5-20 ml. The in vivo "attached" method can be applied to varieties with relatively round and smooth stem structures, and is not recommended for varieties with irregular stem structures. The in vivo "detached" method can be used for the indirect uptake of momo-ingredients into the flowers of cauliflower and broccoli. Suitable varieties contain round, smooth, stems feeding into raw vegetables and fruits. Larger bulbs can be used for the relatively thick stems than those used for tomato. Alternatively, stems are contacted with a container containing at least one solution with at least one momo-ingredient.

Indirect introduction of momo-ingredients into the leaves of spinach is carried out in a similar way as what was described for lettuce.

Indirect introduction of momo-ingredient(s) into the modified thickened stem of onion and shallot, as well as the root of radish, sweet potato, turnip, and parsnip, is similar to what was described for carrot. The in vivo "attached" method can be employed, whereby at least one above-ground stem is cut and contacted with a solution containing at least one momo-ingredient.

Example 7

Raw Vegetables with Modified Aroma

Celery, freshly cut at the base of the main stem, was contacted with a 5 ml solution containing 3 drops of Green No. 3 and 15 drops of Capella's lemon and lime flavor concentrate. After overnight incubation (a fan was turned on during the first two hours), the lowest part of the stem was removed, and the stem, which now had dark green veins, was found to display a pleasant lemony aroma and appear to have a taste slight lemony flavor.

Similar indirect introductions with two other flavor concentrates from Capella, "butter" and "spearmint" did not noticeably enhance the sensory characteristics. Furthermore, lemon lime flavor did not effectively change aroma when used to process Romaine lettuce.

Other ingredients that function well in enhancing the aroma of vegetables and fruits include maltol, ethyl maltol, methyl anthranilate, methyl salicylate, and vanillin (0.1 g vanillin is first dissolved in 1 ml propylene glycol, and the volume is them slowly increased to 5 ml with water).

Example 8

Raw Herbs with Modified Quality ("Landweed")

Seaweed is a traditional food in parts of Asia and has become increasingly popular in parts of Europe and America. A new alternative is presented here and called "landweed." This product is herbs that were processed through indirect introduction, coated with alginate, and dried according to the following procedure.

Step (a): prepare solution J: (i) start with 8 ml water, (ii) add 0.15 g g hydroxypropyl-beta-cyclodextrin and shake until dissolved, (iii) add 0.03 g capsaicin, and shake until dissolved (facilitated by heating), (iv) add 15 microliter L77 and shake gently, (v) optionally, add 1 ml beet extract, and shake gently, (vi) optionally, add any of 2.5 ml supernatant from 0.8 g *ginseng* (with 7% ginsenosides), 0.2 g *stevia*, 0.05 g acesulfame-K, (vii) ensure a final volume of about 10 ml.

Step (b): subject the cut stem surface of parsley to solution J for a sufficient period of time, e.g. about 4-20 hrs, optionally while subjected to fan-drying to facilitate uptake. Step (c): spray the processed herb with n solution (about 35-45 degrees Celsius) containing calcium alginate (e.g. about 1 to 1.5 g/40 ml), about 3 times to ensure complete coverage of stems and leaves, or immerse the herb into the warm solution. Step (d) dry upside-down with a fan blower.

The calcium-alginate solution can optionally contain certain ingredients such as ascorbate acid (about 0.1 g/40 ml), caffeine (about 0.1 g/40 ml), or sodium chloride (about 0.3 g/40 ml). In some cases, it may be desirable to exclude the use of capsaicin, and indirectly introduce only (1) a sweetener, selected from the group of *stevia*, sucralose, acesulfame-K, beet extract, and (2) *ginseng*.

Example 9

Apparatus

This disclosure also presents an apparatus that can be used for the in vivo "detached" method for carrots or other fruits. A suitable apparatus that can be used to indirectly introduce at least one momo-ingredient into multiple vegetables or fruits using the in vivo "detached" method can include the following elements: (1) a base that can contain a solution with the momo-ingredients(s) and (2) a holding grid for placement of the vegetables or fruits in such a way that only part of their associated stem-ends contact the solution.

Figure 6:
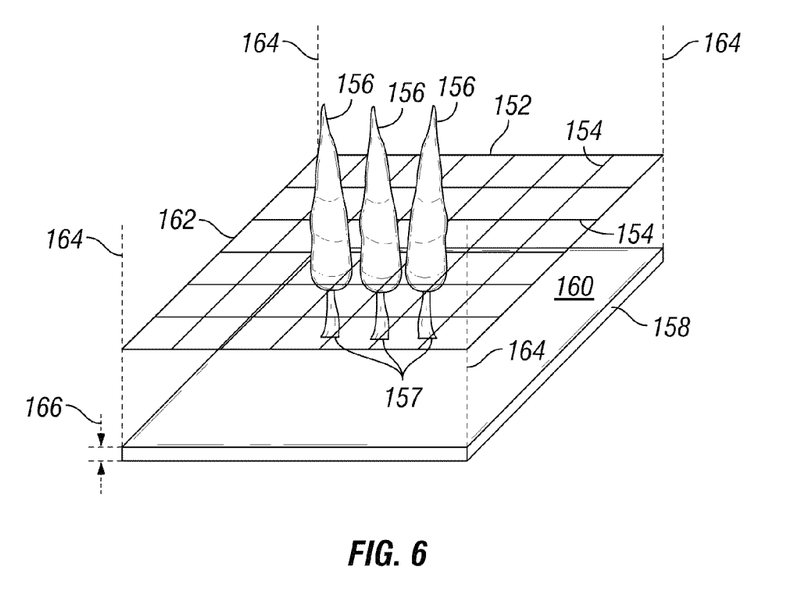
FIG. 6 is a perspective view of an exemplary apparatus that can be used for the in vivo "detached" method for carrots.

A perspective view of an embodiment of this apparatus is shown in FIG. 6. This apparatus 150 includes a grid or mesh 152 of wires or rods 154, which is a holder configured for holding multiple fruits 156. The grid 152 is positioned above a tray or trough 158 that contains a momo-ingredient solution 160. The grid 152 can be held within a box or container, indicated generally at 162, having walls (not shown) whose corners are indicated at dashed lines 164. The solution 160 has a depth (e.g. about 0.1 to 1 cm), which is indicated at 166.

With this apparatus 150, multiple fruits 156 (e.g. carrots) can be held in position with their stems 157 contacting the momo-ingredient solution 160 for any desired length of time in order to receive an infusion of the selected momo-ingredient. The apparatus 150 shown in FIG. 6 is configured for the simultaneous processing of up to 42 carrots (the figure shows 3 carrots for clarity). The container 162 that includes the grid 152 and momo-ingredient solution 160, with the fruits therein, can be made portable, so that it can be placed within a cooler or environmental control apparatus, so as to preserve and protect the quality of the fruit during infusion.

In using this apparatus, after carrots (of other fruit) and part of their stems are cut away from the foliage, they are inverted and placed in the holder 152. The cut surface of the stems is immersed into the solution 160 containing at least one momo-ingredient. After incubation for at least 2-hrs, the carrots can be removed from the holder 152. The final processed raw carrots are obtained by cutting away, at least, the part of their stem-ends 157 that contacted the solution 160.

Example 10

Some Applications

There are numerous applications for the current invention. One application is a kit for personal use. This kit can include: (1) a booklet or flyer with an introduction on the benefits of raw food processing, methods for the indirect introduction of momo-ingredients into vegetables and fruits, and recipes on how to use the infused raw vegetables and fruits as food; (2) small amounts, typically less than 10 gram or 25 ml, of various momo-ingredients, including sweeteners such as sucralose, acesulfame-K, and additives such as caffeine, capsaicin, beet extract, and food colorants such as Green No. 3 and Red No. 40; and (3) 2-ml bulbs that can be attached to cut stem surfaces.

Another application is directed to the restaurant business. The method disclosed herein and the products made thereby provide chefs with new options in developing their menus because they can include unique raw foods containing momo-ingredients, either as they are or further processed. For example, whole sweet carrots or rasped sweet carrots, or whole spicy and colored celery stalks or the cut version of them can be offered to customers.

In yet another application, retailers can offer individually-wrapped raw foods, such as a sweet and spicy raw carrot that also contains caffeine.

It is believed that the methods described herein can also be used to develop bananas with very sweet fruit and a very sweet peel. The sweetness of a momo-ingredient such as sucralose does not just transport into the banana fruit, but also into the banana peel. It has been discovered that sweetness in the peel masks the natural bitterness of the peel, which means that consumers can eat the fruit and also parts of the peel.

The present disclosure thus provides unique, non-lethal methods and apparatus suitable for raw food processing, and the products produced thereby. The methods can be used to modify the taste, flavor, aroma, health-promoting activity, and/or stimulating activity ("quality") of a raw vegetable or fruit without noticeably affecting texture, shape, phytonutrient content, portability and storability. Essentially, the methods are based on the indirect introduction of at least one momo-ingredient into that raw vegetable or fruit.

The momo-ingredient is selected from a group of food ingredients that (a) display at least one quality-modifying property, (b) can be dissolved in water and, as such, absorbed into a stem-end that is physically associated with a vegetable or fruit, (c) can be transported from that stem-end into the associated vegetable or fruit without being fully degraded or metabolized, and (d) impart to that vegetable or fruit a noticeably modified quality without noticeably damaging it. Examples of momo-ingredients include, but are not limited to, acesulfame-K, sucralose, capsaicin, and caffeine, and they do not include some of the most commonly used ingredients in food processing, such as sucrose, fructose, glucose, sodium chloride, and acetic acid.

In one embodiment, the indirect introduction of at least one momo-ingredient into a vegetable or fruit is achieved according to the following two steps: first, the vegetable or fruit is harvested in such a way that it is still attached to (associated with) a stem-end of at least 0.3 cm; and, second, part of this stem-end only is contacted with a solution containing at least one momo-ingredient for at least 2 hours. Thus, the vegetable or fruit is not itself immersed into the solution containing the momo-ingredient(s), and the skin of the vegetable or fruit is not contacted with the solution containing the momo-ingredient(s).

To clarify, examples of products of the present invention include a raw tomato that contains within itself a sufficient amount of Acesulfame-K to taste noticeably sweeter than an untreated raw tomato, a raw celery that contains within itself a sufficient amount of capsaicin to taste spicy, or a raw carrot that contains within itself a sufficient amount of caffeine to provide the stimulatory activities of coffee. These examples are very different from typical examples of conventionally-processed (dead) vegetable or fruit products that include, for instance, cucumber pickles, tomato juice, sugar-infused strawberries, and French fries.

The present invention can also be applied to modify the quality of an edible part of a plant that is not a vegetable or a fruit, such as an herb. Furthermore, the present invention relates to an apparatus that can be used to indirectly introduce at least one momo-ingredient into a large number of vegetables or fruits at the same time. And, finally, the present invention relates to and discloses raw products that contain, within themselves, noticeable amounts of at least one momo-ingredient.

Having now fully described this invention, it will be appreciated by those skilled in the art that the method can be performed within a wide range of equivalent parameters, concentrations and conditions, without undue experimentation. This application is intended to cover any variations, uses, or adaptations of the invention, following in general the principles of the invention, that include such departures from the present disclosure as come within known or customary practice within the art to which the invention pertains and as may be applied to the essential features hereinbefore set forth.

Although various embodiments have been shown and described, the present disclosure is not so limited and will be understood to include all such modifications and variations are would be apparent to one skilled in the art.

What is claimed is:

1. A method for modifying a quality of a fruit, comprising:
cutting a live stem attached to a live fruit of a plant at a cut distance from the fruit and above a location of attachment of the fruit to the stem while the plant remains planted in ground, producing a cut end of the stem;
contacting the cut end of the stem with a solution comprising at least one mobile and quality-modifying food ingredient, selected from the group of mobile and quality-modifying food ingredients consisting of acesulfame-K, sucralose, steviosides, neohesperidin dihydrochalcone, capsaicin, dihydrocapsaicin, nonivamide, allicin, maltol, ethyl maltol, methyl anthranilate, methyl salicylate, vanillin, anthocyanin, betalain, norbixin, gingerol, theobromine, theophylline, ginsenosides, caffeine, carmine, chlorophyllin, and betanin, while protecting the fruit from contact with the solution by attaching a bulb to the cut end of the stem, the bulb containing the solution; and
keeping the cut end of the stem in contact with the solution for an incubation time sufficient to allow absorption and transport of the food ingredient into the fruit, the food ingredient conferring a modified quality upon the fruit.

2. A method in accordance with claim 1, wherein the solution contains at least one compound that promotes introduction of the mobile and quality-modifying food ingredient into the fruit, the at least one compound being selected from the group consisting of cyclodextrin, sucrose, surfactant, ethanol, polyethylene glycol, propylene glycol, potassium hydroxide, polyethylene glycol, propylene glycol, hydrochloric acid and citric acid.

3. A method in accordance with claim 1, wherein the cut distance is from 1-50 cm.

4. A method in accordance with claim 1, wherein the incubation time is from 2-72 hours.

5. A method in accordance with claim 1, wherein the food ingredient comprises a dissolved food ingredient that (i) can be absorbed into the cut end of the stem, (ii) transported through a vascular system into the fruit without being fully degraded or metabolized and without causing noticeable damage to the fruit, and (iii) is capable of conferring a modified quality upon the fruit.

6. A method in accordance with claim 1, further comprising removing from the fruit the cut end of the stem that was contacted with the solution.

7. A method in accordance with claim 1, wherein the mobile and quality-modifying food ingredient is selected from the group of mobile and quality-modifying food ingredients consisting of acesulfame-K, sucralose, steviosides, neohesperidin dihydrochalcone, capsaicin, dihydrocapsaicin, nonivamide, and allicin, and wherein the modified quality is selected from the group consisting of taste, flavor, aroma, health-promoting activity, stimulating activity, and color.

8. A method in accordance with claim 1, wherein the fruit is selected from the group consisting of tomato, carrot, celery, lettuce, parsley and strawberry.

9. A method in accordance with claim 1, further comprising detaching the fruit from the plant.

10. A method in accordance with claim 1, wherein the mobile and quality-modifying food ingredient is selected from the group of mobile and quality-modifying food ingredients consisting of maltol, ethyl maltol, and methyl anthranilate, and wherein the modified quality is aroma.

11. A method in accordance with claim 1, wherein the mobile and quality-modifying food ingredient is selected from the group of mobile and quality-modifying food ingredients consisting of methyl salicylate, gingerol, theobromine, theophylline, and ginsenosides, and wherein the modified quality is health-promoting activity.

12. A method in accordance with claim 1, wherein the mobile and quality-modifying food ingredient is selected from the group of mobile and quality-modifying food ingredients consisting of caffeine, theobromine, theophylline, and ginsenosides, and wherein the modified quality is stimulating activity.

13. A method in accordance with claim 1, wherein the mobile and quality-modifying food ingredient is selected from the group of mobile and quality-modifying food ingredient consisting of betalain, norbixin, carmine, chlorophyllin, and betanin, and wherein the modified quality is color.

14. A system for indirectly introducing at least one mobile and quality-modifying food ingredient into an edible raw fruit, comprising:
   a base, configured to contain a solution including the at least one mobile and quality-modifying food ingredient; and
   a holder, disposed above the base, configured to receive and support the edible raw fruit away from contact with the solution, with an attached portion of a stem of the raw fruit having a fresh cut surface, and the edible raw fruit being oriented such that a portion of the stem including the fresh cut surface is immersed in the solution.

15. A system in accordance with claim 14, wherein the holder is disposed about 1-20 cm above the base, and the portion of the stem is at least 1 cm long.

16. A system in accordance with claim 14, wherein the mobile and quality-modifying food ingredient is selected from the group of mobile and quality-modifying food ingredients consisting of acesulfame-K, sucralose, steviosides, neohesperidin dihydrochalcone, capsaicin, dihydrocapsaicin, nonivamide, and allicin, and wherein the modified quality is selected from the group consisting of taste, flavor, aroma, health-promoting activity, stimulating activity, and color.

17. A method in accordance with claim 14, wherein the mobile and quality-modifying food ingredient is selected from the group of mobile and quality-modifying food ingredients consisting of maltol, ethyl maltol, and methyl anthranilate, and wherein the modified quality is aroma.

18. A method in accordance with claim 14, wherein the mobile and quality-modifying food ingredient is selected from the group of mobile and quality-modifying food ingredients consisting of methyl salicylate, gingerol, theobromine, theophylline, and ginsenosides, and wherein the modified quality is health-promoting activity.

19. A method in accordance with claim 14, wherein the mobile and quality-modifying food ingredient is selected from the group of mobile and quality-modifying food ingredients consisting of caffeine, theobromine, theophylline, and ginsenosides, and wherein the modified quality is stimulating activity.

20. A method in accordance with claim 14, wherein the mobile and quality-modifying food ingredient is selected from the group of mobile and quality-modifying food ingredient consisting of betalain, norbixin, carmine, chlorophyllin, and betanin, and wherein the modified quality is color.

* * * * *